US012428274B1

(12) United States Patent

Wang et al.

(10) Patent No.: US 12,428,274 B1
(45) Date of Patent: Sep. 30, 2025

(54) AUTOMATED GUIDED FORKLIFT AND FORK CONTROL METHOD THEREFOR

(71) Applicant: VisionNav Robotics USA Inc., Acworth, GA (US)

(72) Inventors: Jianbin Wang, Acworth, GA (US); You Liu, Acworth, GA (US)

(73) Assignee: VisionNav Robotics USA Inc., Acworth, GA (US)

(*) Notice: Subject to any disclaimer, the term of this patent is extended or adjusted under 35 U.S.C. 154(b) by 0 days.

(21) Appl. No.: 19/174,809

(22) Filed: Apr. 9, 2025

(51) Int. Cl.
*B66F 9/14* (2006.01)
*B66F 9/06* (2006.01)
*B66F 9/075* (2006.01)

(52) U.S. Cl.
CPC ............ *B66F 9/063* (2013.01); *B66F 9/0755* (2013.01); *B66F 9/14* (2013.01)

(58) Field of Classification Search
CPC ................. B62B 1/00; B66F 9/06; B66F 9/12
See application file for complete search history.

(56) References Cited

FOREIGN PATENT DOCUMENTS

CN 115477256 A 12/2022
CN 116358563 A 6/2023
CN 117687370 A 3/2024

*Primary Examiner* — Mathew Franklin Gordon

(74) *Attorney, Agent, or Firm* — MUNCY, GEISSLER, OLDS & LOWE, P.C.

(57) ABSTRACT

An automated guided forklift and a fork control method therefor are provided. The automated guided forklift includes a fork and a controller. The controller is configured to perform the following steps: receiving a transverse shift step size, a rotation step size, and a target direction of the fork; controlling the fork to perform a transverse shift motion based on the transverse shift step size and the target direction; and controlling the fork to perform a rotation motion based on the rotation step size and the target direction.

20 Claims, 7 Drawing Sheets

AUTOMATED GUIDED FORKLIFT AND FORK CONTROL METHOD THEREFOR

BACKGROUND OF THE INVENTION

Field of the Invention

The present disclosure relates to a fork control method for an automated guided forklift.

Description of the Prior Art

With the rapid development of the logistics industry, an automated guided forklift is extensively used in warehouse logistics. In a warehouse environment, a layout of goods storage is complex and diverse, which requires the automated guided forklift to accurately pick up and unload goods.

In addition to a fork's moving up and down and moving forwards and backwards during operation, if the goods that need to be picked up or unloaded are not well aligned with the fork, the fork of the automated guided forklift sometimes needs to be rotated and/or transversely shifted to align the goods that need to be picked up.

A traditional forklift is operated by an operator. The operator needs to adjust the position of the fork to adapt to different goods and shelf layouts by virtue of experience. Even in some existing automated guided forklift technologies, there are still problems such as insufficient accuracy, low efficiency, and poor adaptability to complex scenarios in transverse shift and rotation operations for forks. For example, in a warehousing environment of narrow aisle shelves, a storage density of goods is large, and aisles between the shelves are narrow. This requires extremely high precision for transverse shift and rotation of the fork of the automated guided forklift. When palletized goods of different specifications need to be picked up or unloaded, the position of the fork needs to be quickly and accurately adjusted for picking up and stacking. Algorithms of the existing automated guided forklift in these operations are not yet fully perfected, which can easily lead to collisions, pickup failures, inaccurate unloading of goods, or the like. This affects the efficiency and accuracy of entire logistics operations.

BRIEF DESCRIPTION OF THE DRAWINGS

The accompanying drawings are intended to provide a further understanding of the present application and constitute a part of this specification. The accompanying drawings and specific implementations below are used together for explaining the present application rather than constituting a limitation on the present application. In the accompanying drawings.

DETAILED DESCRIPTION

Figure 1A:
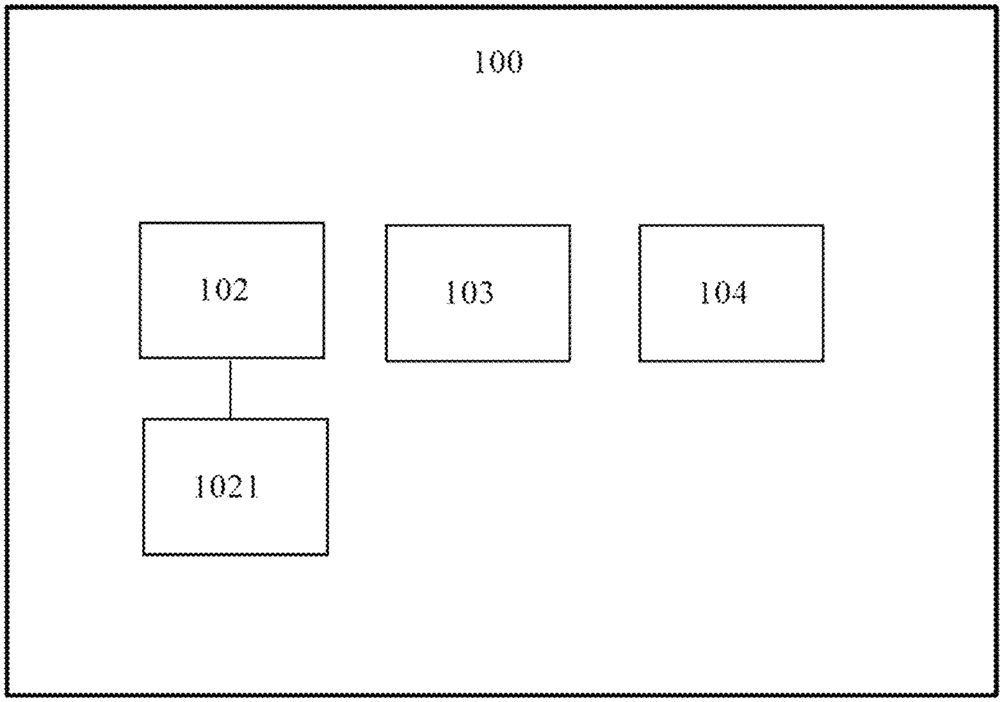
FIG. 1A shows a schematic block diagram of an automated guided forklift according to an embodiment of the present application.

The following disclosure provides various implementations or examples, which can be used to implement different features of the present disclosure. Specific examples of components and configurations described below are used to simplify the present disclosure. It can be conceived that these descriptions are merely for exemplary purposes, and are not intended to limit the present disclosure. For example, in the following description, a first feature is formed on or above a second feature, which may include some embodiments in which the first feature and the second feature are in direct contact with each other. In addition, some embodiments may alternatively be included that an additional component is formed between the first feature and the second feature, so that the first feature and the second feature may not be in direct contact. In addition, in content of the present disclosure, component symbols and/or numbers may be repeatedly used in a plurality of embodiments. The repeated use is for brevity and clarity, and does not represent a relationship between different discussed embodiments and/or configurations.

An automated guided forklift is a device widely applied to intelligent logistics and automated warehousing, and can implement autonomous transportation, unloading, and pickup of goods without manual driving. The automated guided forklift is usually provided with a sensor, a navigation system, and a controller, to ensure efficient and safe operation of the automated guided forklift. With a rapid increase of modern logistics demands, the automated guided forklift has become an important tool for improving the operating efficiency and reducing the manpower costs.

An automated guided forklift path planning method is a core technology that is related to the efficiency and accuracy of picking up and unloading goods by an automated guided forklift. Through precise fork path planning, the automated guided forklift can achieve path planning, obstacle avoidance, and precise goods pickup and unloading, which ensures efficient operation of the automated guided forklift in various complex environments. However, in the existing technology, for transverse shift and/or rotation planning on a fork of the automated guided forklift, a fixed speed is generally provided by an operator, and a desired space is determined through human eyes, without planning a position of the fork during transverse shift/rotation. This not only results in poor stability and low efficiency, but also makes it easy for collisions during the transverse shift/rotation, causing a danger.

In view of this, the present application provides a fork transverse shift/rotation planning method for a fork of an automated guided forklift and an automated guided forklift applying the method, to solve this problem.

For ease of explanation, relevant hardware of the automated guided forklift are defined as follows in the present invention:

Processor: It is responsible for performing core functions such as computation, control, and decision making. The processor can receive data from a sensor, run a control algorithm and the like, and command an actuator to complete a task. Common types of processors include: a central processing unit (CPU), a digital signal processor (DSP), a microcontroller unit (MCU), and the like. The processor herein can be a processor set for performing same or different tasks.

Memory: It is configured to store data, a program algorithm, or the like. The memory here can be a memory set for performing same or different tasks. Optionally, each of the processor, a sensor, and a controller in the present invention may include their own memories/storage units.

Controller: At a hardware level, the controller typically includes a processor and a memory. Optionally, the controller can further include an input/output interface, a motherboard, a peripheral circuit, an element, and the like. At a software level, the controller usually includes a control algorithm, an operating system, a communication protocol, and other parts. The controller herein can be a controller set for performing same or different tasks.

Referring to FIG. 1A, FIG. 1A shows a schematic block diagram of an automated guided forklift 100 according to an embodiment of the present application. In some embodiments, the automated guided forklift 100 may include a controller 102, a sensor 103, and a fork 104. The controller 102 includes a processor 1021. In some embodiments, the controller 102 or the processor 1021 is operatively coupled to the sensor 103. In some embodiments, the controller 102 or the processor 1021 cooperates with the sensor 103 to implement a transverse shift/rotation method for a fork provided in the present application. In some embodiments, the controller 102 may be an integrated element. The controller 102 can be composed of one or more control units/processing units. The processor 1021 may include a computing unit or a core computing unit. The processor 1021 can receive data from the sensor 103 or other hardware devices. The processor 1021 may process data from the sensor 103 or other hardware devices.

In some embodiments, the sensor 103 may be an integrated element. The sensor 103 may be considered as being composed of a plurality of sensor elements. The sensor 103 includes, for example but is not limited to, a Lidar, a visual sensor, and an inertia measurement unit.

Figure 1B:
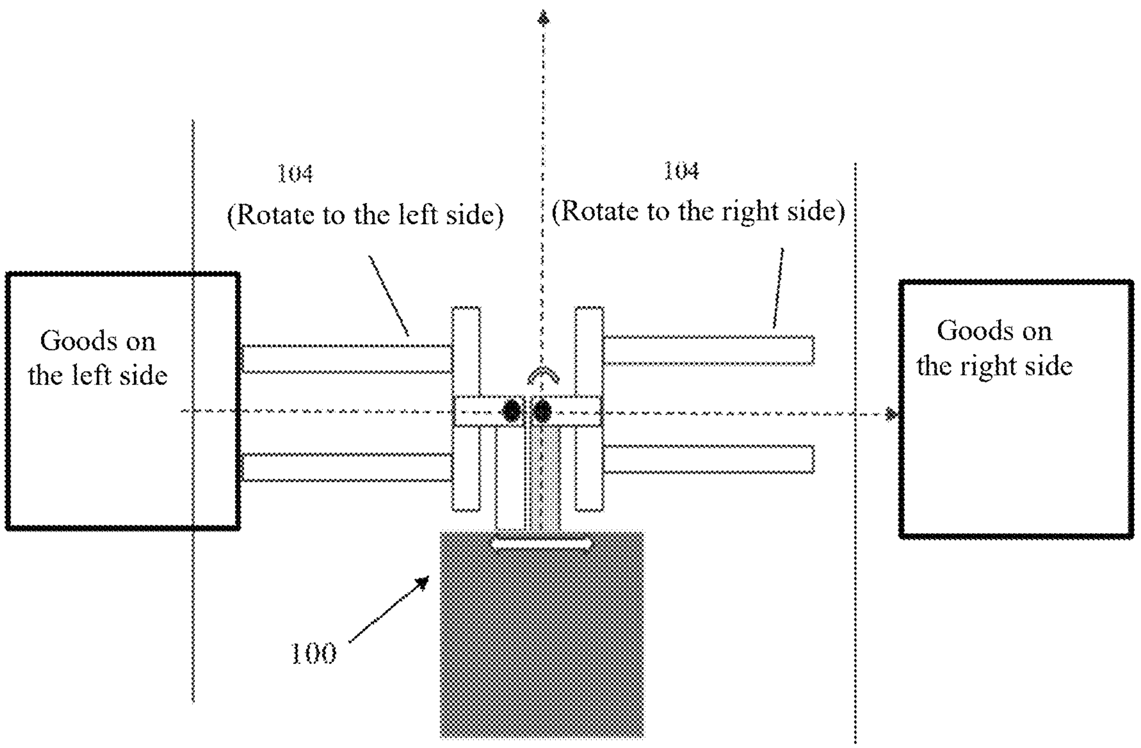
FIG. 1B shows a schematic diagram of use of an automated guided forklift to a warehouse according to an embodiment of the present application.

Referring to FIG. 1B, FIG. 1B shows a schematic diagram of use of an automated guided forklift 100 to a warehouse according to an embodiment of the present application. In some embodiments, the automated guided forklift 100 operates and works in a warehouse shown in FIG. 1B. The automated guided forklift 100 may take goods from a warehouse region according to an instruction, precisely unload the goods at a specified location, and dynamically plan a path for transverse shift/rotation of a fork with cooperation between the sensor 103 and the processor 1021, to avoid collisions and improve the operating efficiency. It should be noted that the pattern of the automated guided forklift 100 shown in FIG. 1B is merely used for exemplary description, and is not intended to limit the scope of the present application.

Figure 2:
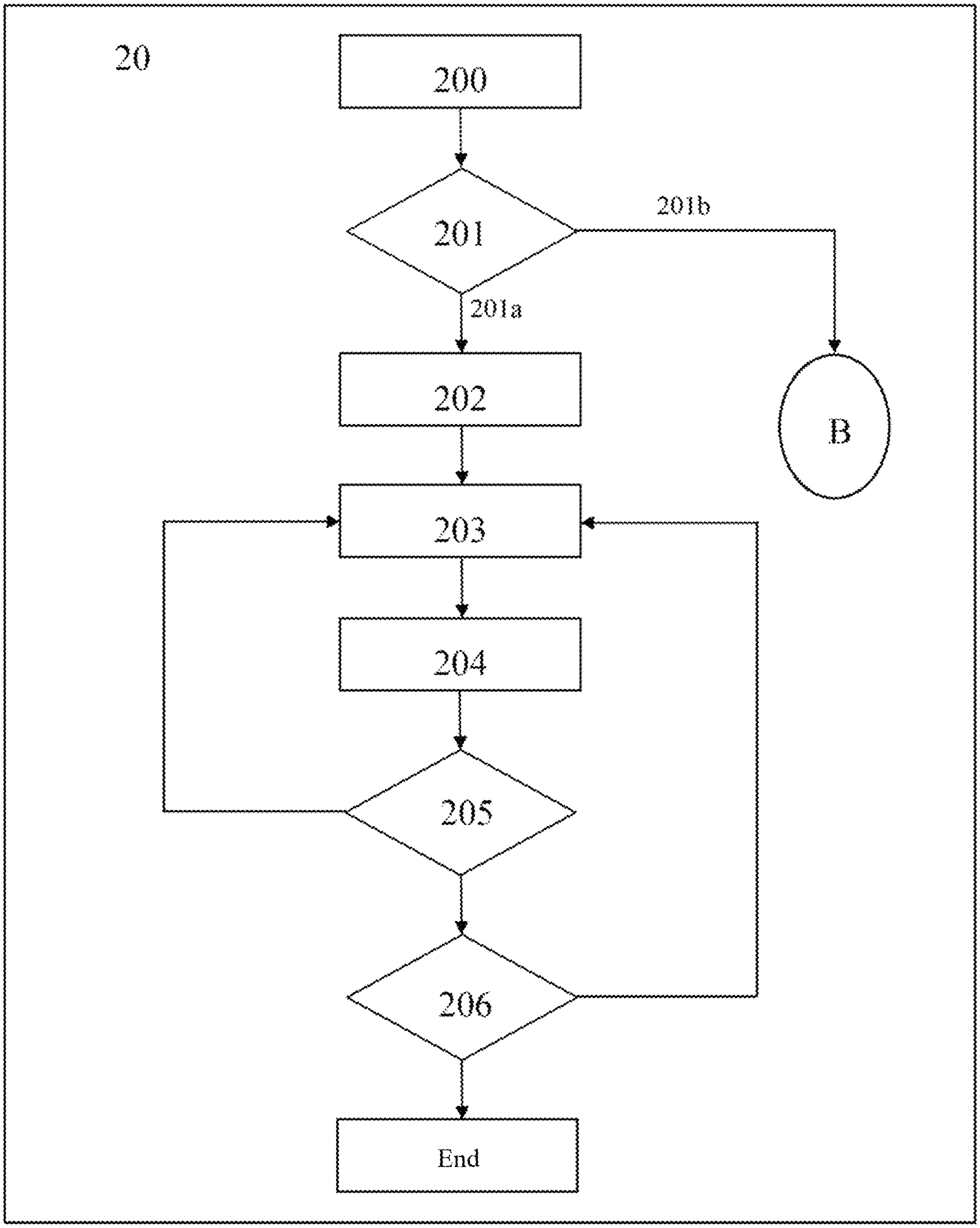
FIG. 2 shows a method flowchart of another part of a transverse shift/rotation method for a fork of an automated guided forklift according to an embodiment of the present application.

FIG. 2 shows a flowchart of a transverse shift/rotation method for a fork of an automated guided forklift according to an embodiment of the present application. If approximately the same result can be obtained, the present application is not limited to be performed according entirely to steps of the flow shown in FIG. 2. It should be noted that steps shown in FIG. 2 are not completely limited to being applied to the automated guided forklift. In other embodiments, the steps shown in FIG. 2 can be applied to any intelligent mobile device. Subsequent embodiments will be illustrated using FIG. 1A and FIG. 1B as examples. In some embodiments, the steps of the transverse shift/rotation method 20 for the fork of the automated guided forklift may be performed by different control units/processing units in the controller 102 or by the same control unit/processing unit.

The transverse shift/rotation method 20 for the fork of the automated guided forklift includes:

Step 200: Whether to pick up and unload goods on a left side or a right side is determined.

In some embodiments, the automated guided forklift 100 receives an instruction (e.g., an instruction sent to the automated guided forklift 100 through wireless communication) that is provided by an upper computer (not shown) and indicates whether to unload goods on a left side or right side of an aisle, and the processor 1021 runs a corresponding algorithm according to the received instruction, and controls the fork 104 to rotate/transversely shift in a corresponding direction. For example, if the automated guided forklift 100 receives the instruction for unloading goods on the right side of the aisle, the processor 1021 determines, according to the instruction, that the fork 104 should rotate to the right side and transversely shift to the left side. In a subsequent step, the processor 1021 further determines whether the fork 104 performs a transverse shift motion first, performs a rotation motion first, or simultaneously performs the transverse shift motion and the rotation motion.

In some embodiments, the automated guided forklift 100 receives an instruction (e.g., an instruction sent to the automated guided forklift 100 through wireless communication) that is provided by an upper computer (not shown) and indicates whether to pick up goods on a left side or right side of an aisle, and the processor 1021 controls, according to the received instruction, the fork 104 to rotate/transversely shift in a corresponding direction. For example, if the automated guided forklift 100 receives the instruction for picking up goods on the right side of the aisle, the processor 1021 determines, according to the instruction, that the fork 104 should rotate to the right side and transversely shift to the left side. In a subsequent step, the processor 1021 further determines whether the fork 104 performs a transverse shift motion first, performs a rotation motion first, or simultaneously performs the transverse shift motion and the rotation motion.

In some embodiments, after receiving the instruction for picking up or unloading goods on the right side of the aisle, in a later step, the processor 1021 controls the fork 104 to rotate to the right around a rotation axis 301 (this is equivalent to clockwise rotation in embodiments shown in FIG. 3A and FIG. 3B). On the contrary, after receiving the instruction for picking up or unloading goods on the left side of the aisle, in a later step, the processor 1021 controls the fork 104 to rotate to the left around the rotation axis 301 (this is equivalent to counterclockwise rotation in the embodiments shown in FIG. 3A and FIG. 3B).

Figure 5:
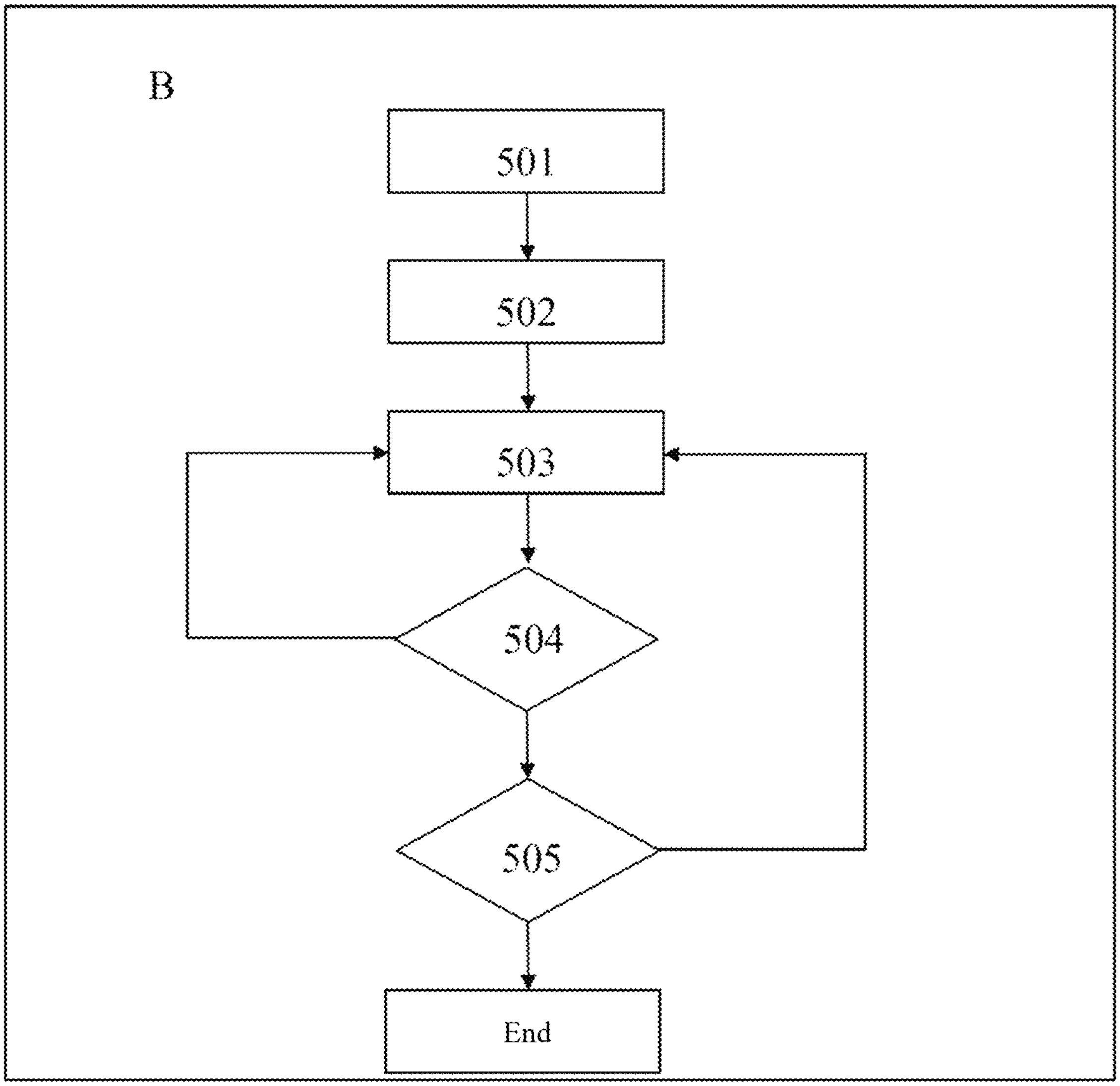
FIG. 5 shows a method flowchart of another part of a transverse shift/rotation method for a fork of an automated guided forklift according to an embodiment of the present application.

Step 201: The processor 1021 determines whether the automated guided forklift 100 operates in mode 201*a* or mode 201*b*. If the automated guided forklift 100 operates in mode 201*a*, step 202 is performed. If the automated guided forklift 100 operates in mode 201*b*, a method flow in FIG. 5 is performed. In some embodiments, mode 201*a* and mode 201*b* respectively correspond to a single-path operating mode and a multi-path operating mode of the automated guided forklift 100. In some embodiments, the single-path operating mode means that the processor 1021 can only control the rotation or transverse shift of the fork 104 of the automated guided forklift 100 at each time. In some other embodiments, the multi-path working mode means that the processor 1021 can simultaneously control the rotation and transverse shift of the fork 104 of the automated guided forklift 100. The method described in the present application is applicable to both a single-path automated guided forklift and a multi-path automated guided forklift. Depending on whether the hardware device supports a mode, if equipment of the automated guided forklift allows, using the multi-path mode can save the motion control time.

Figure 3A:
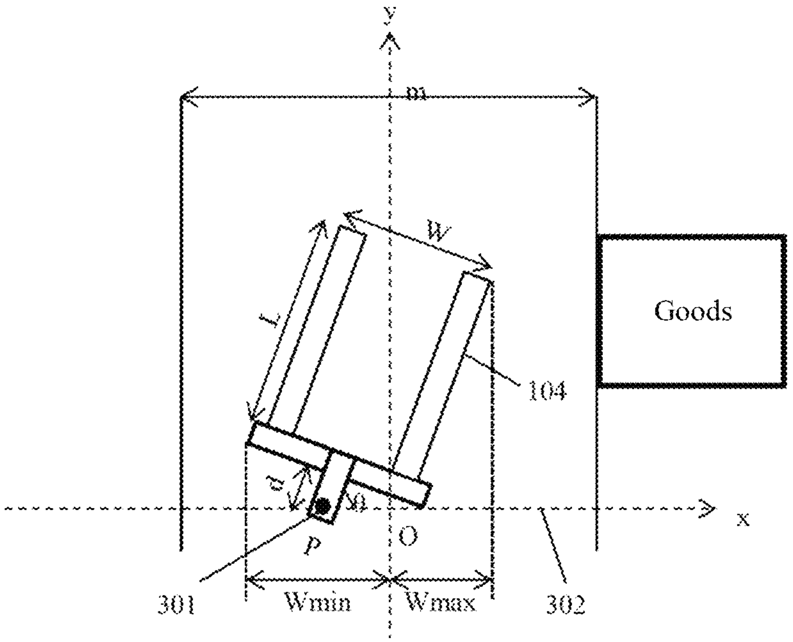
FIG. 3A shows a top view of a fork transversely shifting/rotating to a position according to an embodiment of the present application.
Figure 3B:
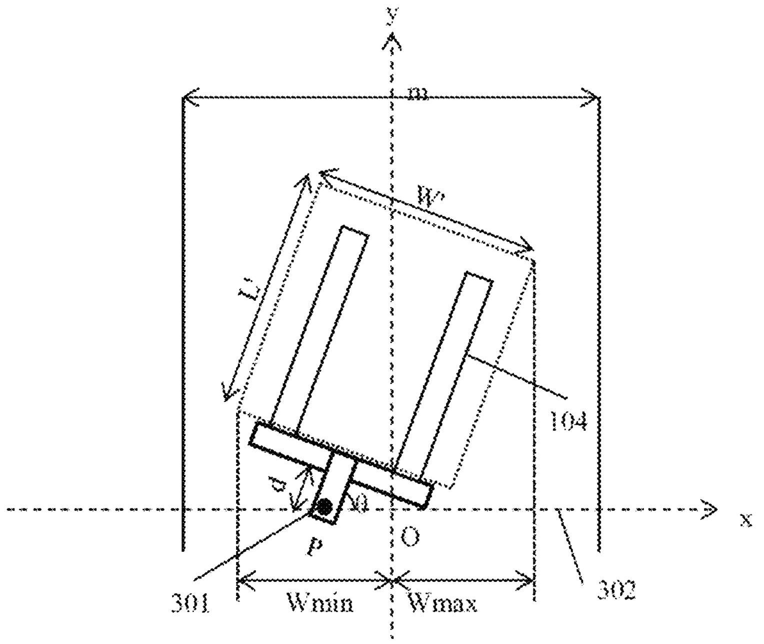
FIG. 3B shows a top view of a fork transversely shifting/rotating to a position according to another embodiment of the present application.

Referring to FIG. 3A and FIG. 3B, FIG. 3A shows a top view of a position during transverse shift/rotation motion of a fork 104 of an automated guided forklift 100 in a no-load state according to an embodiment of the present application. The automated guided forklift 100 in FIG. 3A only shows the fork 104 and a rotation axis, and omits other parts such as a vehicle body of the automated guided forklift 100. The fork 104 generally includes a left fork and a right fork. The two forks are connected to a fork fixing device at their roots. A center of the fork fixing device is fixedly connected to a beam. The beam can rotate, transversely shift, or rise or fall around one end away from the fork fixing device, thereby driving the fork 104 to rotate, transversely shift, or rise or fall.

In some embodiments, for example, when the fork 104 is in a no-load state, the processor 1021 calls a length L and width W of the fork 104 of the forklift 100, as shown in FIG. 3A.

FIG. 3B shows a top view of a position during transverse shift/rotation motion of a fork 104 of an automated guided forklift 100 in a loaded state according to an embodiment of the present application. In some embodiments, for example, when the fork 104 is in a loaded state, the processor 1021 obtains a length L' and width W' of goods on the fork 104 through the sensor 103 (such as a laser sensor or a visual sensor), as shown in FIG. 3B. In some embodiments, L may be greater than, equal to, or less than L'. In other embodiments, W may be greater than, equal to, or less than W'. In order to avoid collisions between the automated guided forklift 100 and a boundary of an aisle, the method disclosed in the present application should use a larger value in L and L' and a larger value in W and W' for calculation in steps described later.

In some embodiments, the length L' and width W' of the goods carried by the fork 104 can be transmitted wirelessly to the automated guided forklift 100 by an upper computer (not shown) in a control room. In other embodiments, the length L' and width W' of the goods carried by the forklift 104 can be obtained through data exchange between the automated guided forklift 100 and a radio frequency (RF) tag on goods to be picked up.

In some embodiments, a width m of an aisle at which the automated guided forklift 100 moves is obtained through the sensor 103 (such as a 2-dimensional/3-dimensional (2D/3D) Lidar). In another embodiment, the width m of the aisle at which the forklift 100 moves can be obtained by matching in a preset list of aisle widths according to a position of the forklift in a warehouse. In another embodiment, an RF tag can be arranged at an entrance of the aisle. When the automated guided forklift 100 reaches an entrance of an aisle, the forklift 100 senses the RF tag and selects an aisle width m corresponding to a value of the RF tag from the preset list of aisle widths m. In another embodiment, a value of the width m of the aisle can alternatively be manually input to the controller 102 of the automated guided forklift 100 through an input device (such as a mouse, keyboard, or another external device connected to the controller of the forklift 100) after starting the forklift 100.

The processor 1021 calls a distance d from a root portion of the fork 104 to the rotation axis 301 of the fork 104. As shown in FIG. 3A and FIG. 3B, the fork 104 can rotate around the rotation axis 301 within a range of 0 to 180°. In addition, it is defined that a rotation angle of the fork 104 is 0 when the fork picks up goods on the left side and that a rotation angle of the fork 104 is 180° when the fork picks up goods on the right side. The fork 104 may alternatively use an intersection of the rotation axis 301 and a transverse shift axis 302 as an anchor point p, and point p can transversely shift to the left and right along transverse shift axis 302. In an exemplary embodiment of the present application, the transverse shift axis is an x-axis shown in FIG. 3A and FIG. 3B. An origin O of a coordinate system is defined as an intersection point between a center of the aisle and the x-axis.

Step 201 further includes: The processor 1021 determines an initial rotation angle $\theta_0$ of the rotation axis 301 according to data obtained by a sensor 103 (e.g. an angle sensor), and the processor 1021 determines an initial position $p_0$ of the transverse shift axis 302 according to data obtained by another sensor 103 (e.g. a distance sensor).

Step 201 further includes: The processor 1021 calls a preset iteration angle $\Delta\theta$ of the rotation axis 301 and a preset iteration displacement $\Delta p$ of the transverse shift axis 302. $\Delta\theta$ indicates a rotation angle increment of the rotation axis 301 in each iteration, and $\Delta p$ indicates a displacement increment of the transverse shift axis 302 in each iteration. Suitable values can be selected for $\Delta\theta$ and $\Delta p$ according to an actual operating requirement. In some embodiments, a value of the rotation angle increment $\Delta\theta$ may be 0.1°, 0.2°, 0.5°, 1°, 1.5°, 2°, 2.5°, 3°, 5°, 8°, 10°, or the like. In some embodiments, a value of the displacement increment $\Delta p$ may be 0.01 m, 0.02 m, 0.05 m, 0.1 m, 0.2 m, or the like. An iteration frequency of the algorithm may be 0.1 s/time, 0.2 s/time, 0.5 s/time, 1 s/time, 1.5 s/time, 2 s/time, or the like.

Step 201 further includes: The processor 1021 calls a preset algorithm E1 to determine a target angle $\theta_{target}$ of the rotation axis 301 and a target displacement $p_{target}$ of the transverse shift axis 302.

$$\left.\begin{array}{l} p_{target} = \frac{m}{2} - \sqrt{\left(\frac{W}{2}\right)^2 + (L+d)^2}\ \theta_{target} = \frac{\pi}{2} + \arctan\left(\frac{2*(L+d)}{W}\right) \text{ (picking up goods on the right side)} \\ p_{target} = -\frac{m}{2} + \sqrt{\left(\frac{W}{2}\right)^2 + (L+d)^2}\ \theta_{target} = \arctan\left(\frac{W}{2*(L+d)}\right) \text{ (picking up goods on the left side)} \end{array}\right\} E1$$

W in formula E1 means a larger value in the width W of the fork 104 in FIG. 3A and the width W' of the goods shown in FIG. 3B. Similarly, L in formula E1 means a larger value in the length L of the fork 104 in FIG. 3A and the length L' of the goods shown in FIG. 3B.

In mode 201, step 202 includes: The processor 1021 calls a preset algorithm E2 to determine a starting motion mode of the fork 104. For example, in some embodiments, the processor 1021 determines, according to the algorithm E2, that the fork 104 first rotates around the rotation axis 301. In other embodiments, the processor 1021 determines, according to the algorithm E2, that the fork 104 first transversely shifts along the transverse shift axis 302.

$$Q = \frac{(\theta target - \theta_0)/\Delta\theta}{(Ptarget - P_0)/\Delta P}$$

Formula E2 determines, according to a ratio of a total step size of rotation iteration of the fork 104 to a total step size of transverse shift iteration of the fork 104, whether a starting motion is a rotation motion or a transverse shift motion of the fork 104. If Q is less than 1, it indicates that the total step size of the iteration of the transverse shift is larger, and the processor 1021 preferentially starts iteration from controlling the transverse shift motion of the fork 104. On the contrary, if Q is greater than 1, it indicates that the total step size of the rotation motion is larger, and the processor 1021 preferentially starts iteration from controlling the rotation motion of the fork 104. This can reduce the number of times of switching different motions during the iteration (e.g. switching from the rotation motion of the fork 104 to the transverse shift motion).

In some other embodiments, the starting motion mode of the fork of the automated guided forklift 100 is directly sent by the upper computer (not shown) through wireless communication, without determining the starting motion mode of the fork 104 through the above method in step 202. For example, when picking up goods on the right side, the forklift 100 receives an instruction that is sent by the upper computer and instructs the fork 104 to first start the rotation motion. After receiving the instruction, the processor 1021 controls the fork 104 to switch from a stationary state to a state of rotating around the rotation axis 301.

Step 203: The processor 1021 determines, according to the starting motion mode of the fork 104 determined in step 202, whether a next motion of the fork 104 is transverse shift or rotation, and determines a motion direction. In some embodiments, there are two motion types for the fork 104: rotation around the rotation axis 301 and transverse shift along the transverse shift axis 302. In an embodiment, there are two motion directions for the fork 104: a forward direction, i.e. towards a target, and a backward direction, i.e. away from the target. For example, when goods are located on the right side of the aisle, turning of the fork 104 to the right is forward rotation. Meanwhile, in order to provide a sufficient space for the fork 104 to rotate to the right without colliding with the goods or the boundary of the aisle, transverse shift of the transverse shift axis 302 to the left is forward transverse shift. A combination of each motion type and each motion direction is referred to as a motion mode. Therefore, in the present invention, the fork 104 has four motion modes: forward rotation around the rotation axis 301, backward rotation around the rotation axis 301, forward transverse shift along the transverse shift axis 302, and backward transverse shift along the transverse shift axis 302. The fork 104 has the foregoing four possible motion modes during each motion iteration as long as it does not collide with the boundary. In order to make the entire motion process more energy-efficient and efficient, the processor 1021 should select a motion mode with a smallest motion cost value from the foregoing four possible motion modes and control the fork 104 to perform the motion mode. The present application uses the following three weight coefficients to determine motion cost values of the above four possible motion modes. See Table 1:

TABLE 1

Weight coefficients of the motion cost values

| Serial number | Weight coefficients of the motion cost values | Yesx | No |
|---|---|---|---|
| 1 | Whether a next motion of the fork 104 is towards a target direction like a current motion | 0.6 | 2.0 |
| 2 | Whether a next motion of the fork 104 is transverse shift or rotation like a current motion** | 1.0 | 1.2 |
| 3 | Whether a next motion of the fork 104 is in the same forward or backward direction as a current motion | 0.8 | 1.3 |

**If the type of the current motion of the fork 104 is transverse shift of the fork 104, and the type of the next motion is rotation of the fork 104, or if the type of the current motion of the fork 104 is rotation of the fork 104, and the type of the next motion is transverse shift of the fork 104, a value of weight coefficient 3 in Table 1 should be set to 1.

: If the type of the current motion of the fork 104 is transverse shift of the fork 104, and the type of the next motion is rotation of the fork 104, or if the type of the current motion of the fork 104 is rotation of the fork 104, and the type of the next motion is transverse shift of the fork 104, a value of weight coefficient 3 in Table 1 should be set to 1. Since rotation and transverse shift are two different motion types for the fork 104, it does not involve whether the next motion of the fork 104 is in the same forward or backward direction as the current motion. Whether the next motion and the current motion are in the same direction can be discussed only when the type of the next motion of the fork 104** is transverse shift or rotation like the current motion.

The motion cost values of the four possible motion modes of the next motion of the fork 104 can be calculated using the following formula according to the values of the three weight coefficients in Table 1:

The motion cost value of next motion=an accumulated motion cost value of the current motion+weight coefficient 1*weight coefficient 2*weight coefficient 3

The "accumulated motion cost value of the current motion" in the formula means an arithmetic sum of the motion cost values of each motion performed by the fork 104 before. A logic for setting a weight coefficient in Table 1 is that when both the next motion and the current motion are towards the target direction and are both transverse shift or rotation, the next motion has a smallest motion cost value, which ensures the continuity of the motion iteration in the same direction. In the motion iteration process of the fork 104, by combining a boundary condition (for details, see the description of step 205), a motion mode that causes the fork 104 to collide with the boundary of the aisle/or picked goods may be removed and not be iterated.

For example, as mentioned earlier, each motion of the fork 104 includes four possible motion modes: forward rotation, backward rotation, forward transverse shift, and backward transverse shift. If it is determined in step 202 that a motion mode currently performed by the fork 104 is forward rotation, and it is assumed that the "accumulated motion cost value of the current motion" is 0.48, in this case, the motion cost values of the four possible motion modes of the next motion of the fork 104 can be calculated using the foregoing calculation formula for a motion cost value according to the values of the three weight coefficients in Table 1:

The motion cost value of motion mode 1 (forward rotation): 0.48+0.6*1.0*0.8=0.96

The motion cost value of motion mode 2 (backward rotation): 0.48+2.0*1.0*1.3=3.08

The motion cost value of motion mode 3 (forward transverse shift): 0.48+0.6*1.2*1=1.2

The motion cost value of motion mode 4 (backward transverse shift): 0.48+2.0*1.2*1=2.88

Therefore, when the current motion of the fork 104 is forward rotation, it can be determined that the next motion of the fork 104 is forward rotation, so that the motion cost value is minimum, and the efficiency is the highest. Therefore, the processor 1021 controls the next motion of the fork 104 to be iterated to be forward rotation. In other words, when the next motion mode of the fork 104 is the same as the current motion mode, the motion cost value is minimum.

In some embodiments, the motion mode with the smallest motion cost value of the fork 104 may be: backward rotation. In some other embodiments, the motion mode with the smallest motion cost value may be: forward transverse shift. In other embodiments, the motion mode with the minimum motion value may be: backward transverse shift. According to the current motion of the fork 104 (whether it is rotation or transverse shift, whether it is in the forward direction or the backward direction), the weight coefficients of the motion cost values in Table 1 are substituted, and the motion mode with the smallest motion cost value of the fork 104 is determined through the above calculation formula for a motion cost value. The processor 1021 controls the fork 104 to perform the motion mode with the smallest motion cost value.

In some other embodiments, since the fork 104 has satisfied the boundary condition, if the motion mode with the smallest motion cost value is still selected for the next motion (namely, the same motion mode as the previous motion is selected), the fork may collide with the goods or the boundary of the aisle. In this case, the processor 1021 may exclude the motion mode with the smallest motion cost value and further consider a motion mode with a smaller motion cost value. If the processor 1021 further determines that the motion mode with the smaller motion cost value may still cause the fork 104 to collide with the goods or the aisle, the processor 1021 may further exclude the motion mode with the smaller motion cost value . . . and so on.

In some other embodiments, similar to the previous description, although the fork 104 does not satisfy the boundary condition, if the transverse shift axis of the fork 104 has reached its extreme position, or the rotation axis of the fork 104 has turned to its extreme angle, it means that the fork 104 cannot continue to perform the motion mode that is the same as the motion mode of the current motion. In this case, the processor 1021 may exclude the motion mode with the smallest motion cost value and further consider a motion mode with a smaller motion cost value. If the processor 1021 further determines that the motion mode with the smaller motion cost value may still belong to an extreme transverse shift position or an extreme rotation angle of the fork 104, the processor 1021 may further exclude the motion mode with the smaller motion cost value . . . and so on.

The weight coefficients of the motion cost values in Table 1 of the present application only show preferred weight values and do not represent exclusion of other weight values or other weight coefficients.

Step 204: The processor 1021 calls a preset algorithm E3 to determine a next iteration amount for the fork 104. Specifically, the processor 1021 determines a next angle iteration value $\theta_{k+1}$ of the rotation axis 301 and/or a next displacement iteration value $p_{k+1}$ of the transverse shift axis according to the algorithm E3, and controls the fork 104 to rotate around the rotation axis 301 to an angle $\theta_{k+1}$ and/or controls the fork 104 to transversely shift to a coordinate $p_{k+1}$ along transverse shift axis 302.

$$\left.\begin{aligned} \theta_k + 1 &= \theta_k + \Delta\theta \\ p_k + 1 &= \theta_k + \Delta p \end{aligned}\right\} E3$$

Step 205: The processor 1021 calls a preset algorithm E4 to calculate whether the automated guided forklift 100 satisfies a boundary collision condition. If the boundary collision condition is satisfied, the automated guided forklift 100 may collide with the aisle, and cannot continue to do motions in the motion direction that is the same as the current motion. In this case, the motion mode of the fork 104 needs to be switched, and step 203 is performed for next iteration, as shown in FIG. 2. In some embodiments, the fork 104 may switch from the rotation motion around the rotation axis 301 to the transverse shift motion along the transverse shift axis 302. In some other embodiments, the fork 104 may switch from the transverse shift motion along the transverse shift axis 302 to the rotation motion around the rotation axis 301.

$$W_{max} < m/2 \ \& \ W_{min} > -m/2 \qquad E4$$

In order to ensure that the entire automated guided forklift 100 does not collide with the boundary of the aisle in the present application, a maximum value $W_{max}$ of a projection of the automated guided forklift 100 on the x-axis needs to be less than a coordinate m/2 of a right boundary of the aisle, and a minimum value $W_{min}$ of the projection of the automated guided forklift 100 on the x-axis needs to be greater than a coordinate −m/2 of a left boundary of the aisle. According to the coordinates of point p and the size of the fork (goods) of the automated guided forklift, the processor 1021 can calculate values of $W_{max}$ and $W_{min}$, and determine whether the automated guided forklift 100 satisfies the boundary collision condition.

If the boundary collision condition is not satisfied, it means that the automated guided forklift 100 will not collide with the boundary of the aisle. Step 206 below is continued to be performed.

Step 206: The processor 1021 calls a preset algorithm E5 as below to calculate whether the fork 104 has reached a target position ($p_{target}$, $\theta_{target}$). If the fork does not reach ($p_{target}$, $\theta_{target}$), step 203 is performed for next iteration. In some embodiments, if the fork has reached $p_{target}$, but does not reach $\theta_{target}$, step 203 is performed for iteration for $\theta_{k+1}$. In some other embodiments, if the fork does not reach $p_{target}$, but has reached $\theta_{target}$, step 203 is performed for iteration for $p_{k+1}$. If the fork 104 has reached the target position ($p_{target}$, $\theta_{target}$), the iteration ends.

$$\left.\begin{aligned} p_k - p_{target} &< \Delta p \\ \theta_k - - p_{target} &< \Delta\theta \end{aligned}\right\} E5$$

According to formula E5, when a difference between a transverse shift displacement pk of the fork 104 in a k-th iteration and a target transverse shift displacement value $p_{target}$ is less than an iteration step size Δp, it can be considered that the fork 104 has reached a target transverse shift position. When a difference between a rotation angle θk of the fork 104 in the k-th iteration and a target angle value θtarget is less than the iteration step size Δθ, it can be considered that the fork 104 has reached a target rotation position. In some embodiments, a transverse shift displacement (e.g. 1.05Δp, 1.1Δp, 1.2Δp, 1.3Δp, and 1.5Δp) that is slightly greater than Δp and/or a rotation angle (e.g. 1.05Δθ, 1.1Δθ, 1.2Δθ, 1.3Δθ, and 1.5Δθ) that is slightly greater than Δθ can be selected as right-hand-side values of the inequality in E5, to achieve faster iteration.

Figure 4:
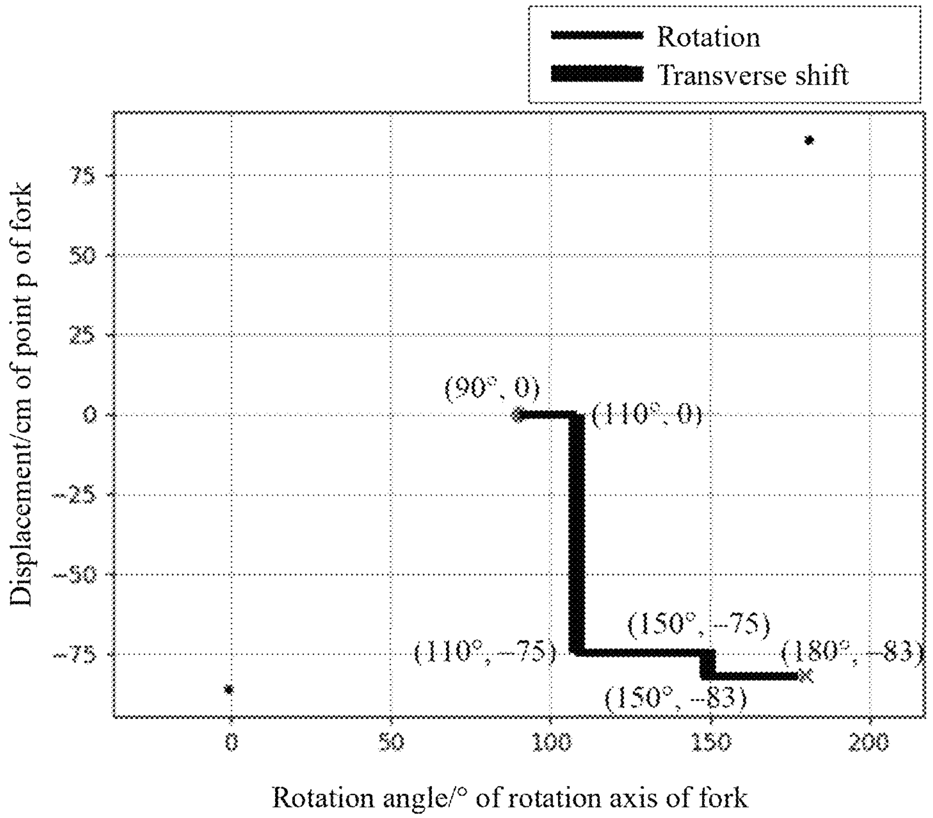
FIG. 4 shows a schematic diagram of displacements and rotation angles of a rotation axis and a transverse shift axis of a fork according to an embodiment of the present application.

FIG. 4 shows a schematic diagram of rotation angles of the rotation axis of the fork 104 and transverse shift displacements of the fork 104 according to the method of FIG. 2. According to FIG. 4, a motion mode of the fork 104 is a single-path motion mode. A starting position of the fork 104 is in the middle of the aisle, and a starting angle of the rotation axis 301 is 90° (a rotation angle range of the fork 104 around the rotation axis 301 is 0 to 180°). A motion process of the fork 104 is summarized as follows:

A starting motion of the fork 104 is forward rotation around the rotation axis 301 (picking up goods on the right side).

When the fork 104 rotates by about 110°, the fork 104 satisfies the boundary collision condition, so that the motion mode is switched to forward transverse shift along the transverse shift axis 302.

When the transverse shift of point p of the fork 104 reaches about −0.75 m, the fork 104 satisfies the boundary collision condition again, and the motion mode is switched back to rotation around the rotation axis 301.

When the fork 104 rotates by almost 150°, the fork 104 satisfies the boundary collision condition, so that the motion mode is switched to forward transverse shift along the transverse shift axis 302.

When the transverse shift of point p of the fork 104 reaches about −0.83 m, the fork 104 reaches $p_{target}$ but still does not reach θ target, iteration in the transverse shift stops, and the previous step of iterating the rotation is performed until the rotation angle of the fork 104 reaches $\theta_{target}$.

Continue to refer to FIG. 5, FIG. 5 continues the method flowchart of FIG. 2 and shows mode 201*b* in FIG. 2. In some embodiments, the transverse shift/rotation method 20 for the fork of the automated guided forklift further includes:

Step 501: The processor 1021 uses a similar method shown in FIG. 2 to FIG. 3B to obtain necessary parameters L/L', W/W', d, m, p0, θ0, $p_{target}$, and $p_{target}$ according to preset data of a system, from the sensor 103, or from the upper computer, or to calculate necessary parameters by calling preset algorithms. Meanings and ranges represented by the above parameters are completely consistent with those shown in FIG. 2 to FIG. 3B.

Step 502: The processor 1021 determines a direction and mode of a next motion of the fork 104 according to the cost values shown in Table 1. In some embodiments, the processor 1021 of the multi-path automated guided forklift can simultaneously control rotation and transverse shift of the fork 104. Therefore, the processor 1021 can calculate a motion direction and mode with a smallest cost value for a next motion based on a previous rotation motion of the fork 104, and the processor 1021 can calculate a motion direction and mode with a smallest cost value for a next motion based on a previous transverse shift motion of the fork 104.

Step 503: The processor 1021 calls a preset algorithm E3 to determine a next iteration amount for the fork 104.

Step 504: The processor 1021 calls a preset algorithm E4 to calculate whether the automated guided forklift 100 satisfies a boundary collision condition. If the boundary collision condition is satisfied, the automated guided forklift 100 may collide with the aisle, and cannot continue to do motions in the motion direction that is the same as the current motion. In this case, the motion mode of the fork 104 needs to be switched, and step 203 is performed for next iteration. In some embodiments, the fork 104 may stop performing the rotation motion around the rotation axis 301, but continue to perform the transverse shift motion along the transverse shift axis 302. In some other embodiments, the fork 104 may stop performing the transverse shift motion along the transverse shift axis 302, but continue to perform the rotation motion around the rotation axis 301.

If the boundary collision condition is not satisfied, it means that the automated guided forklift 100 will not collide with the boundary of the aisle. Step 505 below is continued to be performed.

Step 505: The processor 1021 calls a preset algorithm E5 to calculate whether the fork 104 has reached a target position ($p_{target}$, $\theta_{target}$). In some embodiments, for the explanation of step 505, refer to the embodiment of step 206 mentioned above, and specific details are omitted here to save space.

Figure 6:
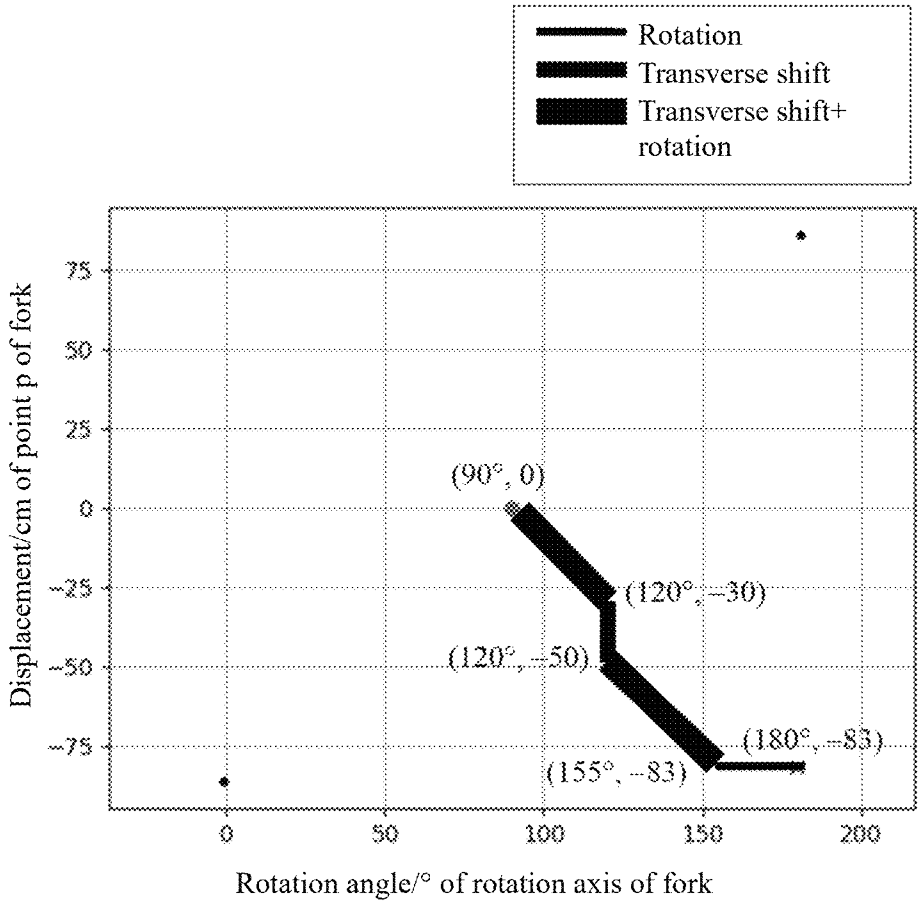
FIG. 6 shows a schematic diagram of displacements and rotation angles of a rotation axis and a transverse shift axis of a fork according to an embodiment of the present application.

FIG. 6 shows a schematic diagram of rotation angles of the rotation axis of the fork 104 and transverse shift displacements of the fork 104 according to the method of FIG. 5. According to FIG. 6, a motion mode of the fork 104 is a multi-path motion mode. A starting position of the fork 104 is in the middle of the aisle, and a starting angle of the rotation axis 301 is 90° (a rotation angle range of the fork 104 around the rotation axis 301 is 0 to 180°). A motion process of the fork 104 is summarized as follows:

A starting motion of the fork 104 is both forward rotation around the rotation axis 301 and transverse shift along the transverse shift axis 302 (picking up goods on the right side).

When the fork 104 rotates by about 120° and the transverse shift of point p of the fork reaches about 0.3 mm, the fork 104 satisfies the boundary collision condition, so that the motion mode is switched to forward transverse shift along the transverse shift axis 302 only.

When the transverse shift of point p of the fork 104 reaches about −0.5 m, the fork 104 no longer satisfies the boundary collision condition, so that the motion mode is switched back to both forward rotation around the rotation axis 301 and transverse shift along the transverse shift axis 302.

When the fork 104 rotates by almost 155° and the transverse shift of point p of the fork reaches about −0.83 m, the fork 104 reaches $p_{target}$ but still does not reach $\theta_{target}$, iteration in the transverse shift stops, and the previous step of iterating the rotation is performed until the rotation angle of the fork 104 reaches $\theta_{target}$.

In an embodiment, after the fork 104 of the automated guided forklift completes the above transverse shift/rotation and faces goods or a shelf, the sensor 103 (such as a laser sensor or a visual sensor) further determines whether the height of the fork 104 is consistent with the height of the shelf or goods. If the sensor 103 has detected that the height of the fork 104 is not consistent with the height of the goods or the shelf, the processor 1021 further controls the fork 104 to rise or fall according to a height value, making the height of the fork 104 consistent with the height of the shelf or goods, thereby safely picking up the goods from the shelf or unloading the goods to the shelf.

As used herein, the terms "approximately", "basically", "basic", and "about" are used to describe and consider small changes. When used in conjunction with an event or situation, the term can refer to examples of events or situations occurring precisely and examples of events or situations occurring very approximately. As used herein relative to a given value or range, the term "about" generally means within ±10%, ±5%, ±1%, or ±0.5% of the given value or range. The range can be represented herein as from one end point to another end point or between two end points. Unless otherwise specified, all scopes disclosed herein include end points. The term "basically coplanar" can refer to two surfaces located along the same plane within a few micrometers (μm), for example, located along the same plane within 10 μm, 5 μm, 1 μm, or 0.5 μm. When values or characteristics are "basically" the same, the term can refer to values within ±10%, ±5%, ±1%, or ±0.5% of an average value of the values mentioned.

As used herein, the singular terms "a/an" and "the" may include plural indicators unless the context otherwise specifies. In some embodiments, an assembly being "on" or "above" another assembly may cover a situation where the previous assembly is directly on the latter assembly (for example, in physical contact with the latter assembly), and a situation where one or more intermediate assemblies are located between the previous assembly and the latter assembly.

The previous text provides an overview of several embodiments and detailed features of the present disclosure. The embodiments described in the present disclosure can be easily used as a basis for designing or modifying other processes, as well as structures for performing the same or similar purposes and/or obtaining the same or similar advantages of the embodiments introduced herein. These equivalent constructions do not depart from the spirit and scope of the present disclosure, and different changes, substitutions, and changes can be made without departing from the spirit and scope of the present disclosure.

We claim:

1. An automated guided forklift (100), wherein the automated guided forklift (100) comprises a fork (104) and a controller (102); and the controller (102) is configured to perform the following steps:

receiving a transverse shift step size, a rotation step size, and a target direction of the fork (104);

controlling the fork (104) to perform a transverse shift motion based on the transverse shift step size and the target direction; and controlling the fork (104) to perform a rotation motion based on the rotation step size and the target direction.

2. The automated guided forklift (100) according to claim 1, wherein the transverse shift motion is performed before the rotation motion.

3. The automated guided forklift (100) according to claim 1, wherein the rotation motion is performed before the transverse shift motion.

4. The automated guided forklift (100) according to claim 1, wherein the transverse shift motion and the rotation motion are simultaneously performed.

5. The automated guided forklift (100) according to claim 1, wherein the steps further comprise:

determining a target transverse shift position of the fork (104) according to the size of the automated guided forklift (100) and the sizes of goods loaded on the automated guided forklift (100);

receiving a transverse shift position of the fork (104); and if a difference between the transverse shift position and the target transverse shift position is greater than or equal to the transverse shift step size, making the fork (104) perform the transverse shift motion.

6. The automated guided forklift (100) according to claim 5, wherein the steps further comprise:

if the difference between the transverse shift position and the target transverse shift position is less than the transverse shift step size, making the fork (104) perform the rotation motion.

7. The automated guided forklift (100) according to claim 5, wherein the steps further comprise:

determining a target rotation position of the fork (104) according to the size of the automated guided forklift (100) and the size of goods loaded on the automated guided forklift (100);

receiving a rotation position of the fork (104); and if a difference between the rotation position and the target rotation position is greater than or equal to the rotation step size, making the fork (104) perform the rotation motion.

8. The automated guided forklift (100) according to claim 7, wherein the steps further comprise:

if the difference between the rotation position and the target rotation position is less than the rotation step size, making the fork (104) perform the transverse shift motion.

9. The automated guided forklift (100) according to claim 7, wherein the steps further comprise:

determining, according to the transverse shift position and the rotation position, a projection of the fork (104) on a cross section of an aisle at which the automated guided forklift (100) moves; and if the projection of the fork (104) does not fall into a width range of the aisle, controlling the fork (104) to stop the rotation motion or the transverse shift motion that is currently being performed.

10. The automated guided forklift (100) according to claim 9, wherein the steps further comprise:

if the projection of the fork (104) does not fall into a width range of the aisle, further controlling the fork (104) to switch between the rotation motion and the transverse shift motion.

11. The automated guided forklift (100) according to claim 1, wherein the steps further comprise:

determining a motion mode of a current motion of the fork (104);

determining one or more possible motion modes of a next motion of the fork (104);

determining a first coefficient of each of the one or more possible motion modes;

determining a motion cost value of each of the one or more possible motion modes according to the first coefficient; and controlling the fork (104) to perform a motion mode with a smallest motion cost value.

12. The automated guided forklift (100) according to claim 11, wherein the steps further comprise:

determining a second coefficient of each of the one or more possible motion modes;

determining a motion cost value of each of the one or more possible motion modes according to the first coefficient and the second coefficient; and controlling the fork (104) to perform a motion mode with a smallest motion cost value.

13. The automated guided forklift (100) according to claim 12, wherein the steps further comprise:

determining a third coefficient of each of the one or more possible motion modes;

determining a motion cost value of each of the one or more possible motion modes according to the first coefficient, the second coefficient, and the third coefficient; and controlling the fork (104) to perform a motion mode with a smallest motion cost value.

14. The automated guided forklift (100) according to claim 13, wherein when the second coefficient of one of the one or more possible motion modes is greater than 1, the third coefficient of the possible motion mode is set to 1.

15. The automated guided forklift (100) according to claim 11, wherein the current motion comprises: the transverse shift motion and/or the rotation motion of the fork (104).

16. The automated guided forklift (100) according to claim 15, wherein the one or more possible motion modes comprise one or more of the following: a forward transverse shift motion, a backward transverse shift motion, a forward rotation motion, and a backward rotation motion.

17. The automated guided forklift (100) according to claim 16, wherein the steps further comprise:

if one or more of the one or more possible motion modes have reached an extreme value, determining one motion mode having a smallest motion cost value from another one or more motion modes in the one or more possible motion modes; and controlling the fork (104) to perform a motion mode with a smallest motion cost value.

18. The automated guided forklift (100) according to claim 16, wherein the steps further comprise:

determining, according to the transverse shift step size, the rotation step size, the target transverse shift position, and the target rotation position, whether a start motion of the fork (104) of the automated guided forklift (100) is the transverse shift motion or the rotation motion.

19. A fork control method for an automated guided forklift (100), comprising a step of controlling the fork (104) of the automated guided forklift (100) according to claim 1 to perform a transverse shift motion and/or a rotation motion.

20. A controller, configured to perform a program instruction comprising: controlling the fork (104) of the automated guided forklift (100) according to claim 1 to perform a transverse shift motion and/or a rotation motion.

* * * * *